US012633810B2

(12) United States Patent
Zhu et al.

(10) Patent No.: US 12,633,810 B2
(45) Date of Patent: May 19, 2026

(54) LINEAR VIBRATION MOTOR WITH ELASTIC CONNECTOR WITH TWO ELASTIC SHEETS SEPERATED BY SPACER AND SOLDERING LUG

(71) Applicant: AAC Microtech (Changzhou) Co., Ltd., Changzhou (CN)

(72) Inventors: Aijie Zhu, Changzhou (CN); Junsheng Wang, Changzhou (CN); Zixu Hua, Changzhou (CN); Jie Liu, Changzhou (CN); Jiulong Hu, Changzhou (CN)

(73) Assignee: AAG Microtech (Changzhou) Co., Ltd., Changzhou (CN)

( * ) Notice: Subject to any disclaimer, the term of this patent is extended or adjusted under 35 U.S.C. 154(b) by 397 days.

(21) Appl. No.: 18/320,181

(22) Filed: May 18, 2023

(65) Prior Publication Data

US 2024/0186876 A1      Jun. 6, 2024

Related U.S. Application Data

(63) Continuation of application No. PCT/CN2022/136718, filed on Dec. 6, 2022.

(51) Int. Cl.
H02K 33/02 (2006.01)

(52) U.S. Cl.
CPC .................................... H02K 33/02 (2013.01)

(58) Field of Classification Search
CPC ........ H02K 33/00; H02K 33/02; H02K 33/16; H02K 35/00; H02K 35/02; H02K 33/04;
(Continued)

(56) References Cited

U.S. PATENT DOCUMENTS 3,279,690 A * 10/1966 Masterson ............... G06K 1/02
                                                              234/119
8,278,786 B2 * 10/2012 Woo ........................ H02K 33/16
                                                              310/15
(Continued)

FOREIGN PATENT DOCUMENTS

CN          204030834 U   * 12/2014   ............. H02K 33/16
CN          104617735 A   *  5/2015   ............. H02K 33/16
(Continued)

OTHER PUBLICATIONS

JP-2006029136-A English Translation.*

*Primary Examiner* — Maged M Almawri
(74) *Attorney, Agent, or Firm* — Wiersch Law Group

(57) ABSTRACT

A linear vibration motor, including: a housing, a stator in the housing, a vibrator, and an elastic connector suspending the vibrator in the housing. The stator includes a solenoid fixed to the housing and includes a weight having a through hole and a magnet assembly fixed to an inner wall of the weight, the elastic connector includes at least two plate-shaped elastic sheets arranged in parallel and a spacer arranged at two ends of two adjacent elastic sheets to separate the two adjacent elastic sheets, the linear vibration motor further includes a first soldering lug, and the elastic connector has an end connected to the weight and another end connected to the housing through the first soldering lug. The elastic connector has high rigidity, and the vibrator is not prone to flipping during motion, a noise ratio is reduced and a vibration state is more stable.

8 Claims, 4 Drawing Sheets

(58) Field of Classification Search
CPC ...... H02K 33/06; H02N 11/00; H02N 11/002;
H02N 11/04
USPC ........ 310/25, 15, 12.01, 81, 80, 321, 20, 21,
310/28–30, 36–37, 40 MM
See application file for complete search history.

(56) References Cited

U.S. PATENT DOCUMENTS

| | | | | |
|---|---|---|---|---|
| 8,288,898 B2 * | 10/2012 | Jun | H02K 33/16 | 310/34 |
| 8,878,401 B2 * | 11/2014 | Lee | H02K 33/16 | 310/15 |
| 9,774,236 B2 * | 9/2017 | Xu | H02K 33/04 | |
| 9,935,535 B2 * | 4/2018 | Guo | H02K 33/16 | |
| 9,936,302 B2 * | 4/2018 | Linghu | H04R 9/06 | |
| 10,076,771 B2 * | 9/2018 | Xu | H02K 33/12 | |
| 10,103,614 B2 * | 10/2018 | Guo | H02K 33/18 | |
| 10,116,194 B2 * | 10/2018 | Mao | H02K 11/215 | |
| 10,153,681 B2 * | 12/2018 | Mao | H02K 33/16 | |
| 10,158,278 B2 * | 12/2018 | Mao | H02K 33/16 | |
| 10,270,304 B2 * | 4/2019 | Wang | H02K 33/16 | |
| 10,307,791 B2 * | 6/2019 | Xu | B06B 1/045 | |
| 10,637,339 B2 * | 4/2020 | Liu | H02K 1/34 | |
| 10,710,115 B2 * | 7/2020 | Huang | H02K 33/02 | |
| 10,797,576 B2 * | 10/2020 | Wu | H02K 33/18 | |
| 10,931,185 B2 * | 2/2021 | Tang | H02K 33/12 | |
| 10,971,984 B2 * | 4/2021 | Liu | H02K 33/10 | |
| 11,201,531 B2 * | 12/2021 | Jin | H02K 33/16 | |
| 11,404,948 B2 * | 8/2022 | Liu | H02K 33/16 | |
| 2011/0006618 A1 * | 1/2011 | Lee | H02K 33/16 | 310/25 |
| 2011/0198949 A1 * | 8/2011 | Furuich | H02K 33/16 | 310/25 |
| 2011/0241451 A1 * | 10/2011 | Park | H02K 33/16 | 310/25 |
| 2011/0266892 A1 * | 11/2011 | Wauke | H02K 33/18 | 310/25 |
| 2012/0169148 A1 * | 7/2012 | Kim | H02K 33/16 | 310/25 |
| 2015/0123498 A1 * | 5/2015 | Yang | H02K 33/16 | 310/25 |
| 2016/0013710 A1 * | 1/2016 | Dong | H02K 33/16 | 310/25 |
| 2016/0226358 A1 * | 8/2016 | Mao | H02K 33/16 | |
| 2016/0226359 A1 * | 8/2016 | Guo | H02K 33/16 | |
| 2016/0254736 A1 * | 9/2016 | Jin | H02K 33/16 | 310/25 |
| 2017/0120298 A1 * | 5/2017 | Mao | B06B 1/045 | |
| 2017/0222532 A1 * | 8/2017 | Wang | H02K 33/16 | |
| 2018/0248457 A1 * | 8/2018 | Shi | F16F 15/08 | |
| 2018/0297075 A1 * | 10/2018 | Ling | B06B 1/045 | |
| 2018/0297076 A1 * | 10/2018 | Xu | B06B 1/045 | |
| 2018/0351442 A1 * | 12/2018 | Liu | H02K 33/16 | |
| 2018/0358879 A1 * | 12/2018 | Liu | H02K 1/34 | |
| 2019/0036435 A1 * | 1/2019 | Zhu | H02K 33/02 | |
| 2019/0044425 A1 * | 2/2019 | Zu | H02K 33/02 | |
| 2019/0052160 A1 * | 2/2019 | Oi | H02K 33/02 | |
| 2019/0305637 A1 * | 10/2019 | Suzuki | B06B 1/045 | |
| 2020/0044526 A1 * | 2/2020 | Tang | H02K 33/18 | |
| 2021/0211030 A1 * | 7/2021 | Li | H02K 33/18 | |
| 2023/0378862 A1 * | 11/2023 | Mao | H02K 33/16 | |

FOREIGN PATENT DOCUMENTS

| | | | | | |
|---|---|---|---|---|---|
| CN | 204334277 U | * | 5/2015 | | |
| CN | 106026603 A | * | 10/2016 | | H02K 33/00 |
| CN | 205847047 U | * | 12/2016 | | |
| CN | 206195534 U | * | 5/2017 | | |
| CN | 206195577 U | * | 5/2017 | | |
| CN | 206195578 U | * | 5/2017 | | |
| CN | 206341117 U | * | 7/2017 | | |
| CN | 206341125 U | * | 7/2017 | | H02K 33/16 |
| CN | 206498310 U | * | 9/2017 | | |
| CN | 206878668 U | * | 1/2018 | | |
| CN | 207559830 U | * | 6/2018 | | |
| CN | 209313684 U | * | 8/2019 | | |
| CN | 209627192 U | * | 11/2019 | | |
| CN | 210350990 U | * | 4/2020 | | |
| CN | 210780488 U | * | 6/2020 | | |
| JP | 2006029136 A | * | 2/2006 | | |
| JP | 2017118805 A | * | 6/2017 | | H02K 33/16 |
| WO | WO-2021114307 A1 | * | 6/2021 | | H02K 33/00 |

* cited by examiner

100

LINEAR VIBRATION MOTOR WITH ELASTIC CONNECTOR WITH TWO ELASTIC SHEETS SEPERATED BY SPACER AND SOLDERING LUG

TECHNICAL FIELD

The present disclosure relates to the field of vibration motors, and in particular, to a linear vibration motor.

BACKGROUND

A linear motor is a transmission device that directly converts electrical energy into linear motion mechanical energy without any intermediate conversion mechanism.

A conventional linear vibration motor includes a housing, a vibrator, and a stator. Generally, the vibrator is fixedly and elastically supported in the housing by a V-shaped or C-shaped spring bracket. However, the V-shaped or C-shaped spring bracket has insufficient rigidity, a difference between first-order and second-order modes is only about twice, a difference between second-order and third-order modes is generally within 60 Hz, and the vibrator is prone to flipping during motion. When a resonant frequency of a product is required to be high, a general practice is to increase a thickness of the V-shaped or C-shaped spring bracket, which may significantly increase spring stress, but the spring bracket is prone to fatigue and fracture, which is not conducive to improving reliability of the product. When the spring stress is required to be high, an existing V-shaped and C-shaped spring bracket may also reduce the stress by improving a blanking shape. This improvement manner has a limited effect and requires continuous trial and error, which is inefficient. Moreover, the existing V-shaped and C-shaped spring bracket has a complex shape and cumbersome manufacturing and assembly processes, which is not conducive to control over product costs.

Therefore, there is a need to provide a new linear vibration motor to solve the above technical problems.

SUMMARY

In a first aspect, the present provides a linear vibration motor, including: a housing, a stator mounted in the housing, a vibrator, and an elastic connector suspending the vibrator in the housing. The stator includes a solenoid fixed to the housing, the vibrator includes a weight provided with a through hole and a magnet assembly fixed to an inner wall of the weight enclosing to form the through hole, the elastic connector includes at least two plate-shaped elastic sheets arranged in parallel and a spacer arranged at two ends of two adjacent plate-shaped elastic sheets to separate the two plate-shaped adjacent elastic sheets, the linear vibration motor further includes a first soldering lug, and the elastic connector has an end connected to the weight and another end connected to the housing through the first soldering lug.

As an improvement, the spacer is a soldering lug, and the spacer is welded and fixed between two adjacent elastic sheets.

As an improvement, the elastic sheets include a first elastic sheet fixedly connected to the weight and a second elastic sheet fixedly connected to the housing, and the elastic connector further includes a second soldering lug arranged at an end of the first elastic sheet not fixed to the weight and a third soldering lug arranged at an end of the second elastic sheet not fixed to the housing.

As an improvement, a thickness of the first soldering lug is greater than a thickness of the second soldering lug, and the thickness of the first soldering lug is greater than a thickness of the third soldering lug.

As an improvement, the weight is provided with a protruding portion extending along a vibrating direction of the vibrator, and the first elastic sheet is fixed to the protruding portion.

As an improvement, the elastic connector further includes a third elastic sheet arranged between the first elastic sheet and the second elastic sheet.

As an improvement, a distance between the third elastic sheet and the first elastic sheet is equal to a distance between the third elastic sheet and the second elastic sheet.

As an improvement, the magnet assembly includes first magnets arranged at two sides of the solenoid along a vibrating direction of the vibrator and second magnets arranged at two ends of the solenoid along a direction perpendicular to the vibrating direction of the vibrator.

As an improvement, the magnet assembly further includes a first pole plate arranged between the inner wall of the weight and each of the first magnets and a second pole plate arranged between the inner wall of the weight and each of the second magnets.

DESCRIPTION OF EMBODIMENTS

Figure 1:
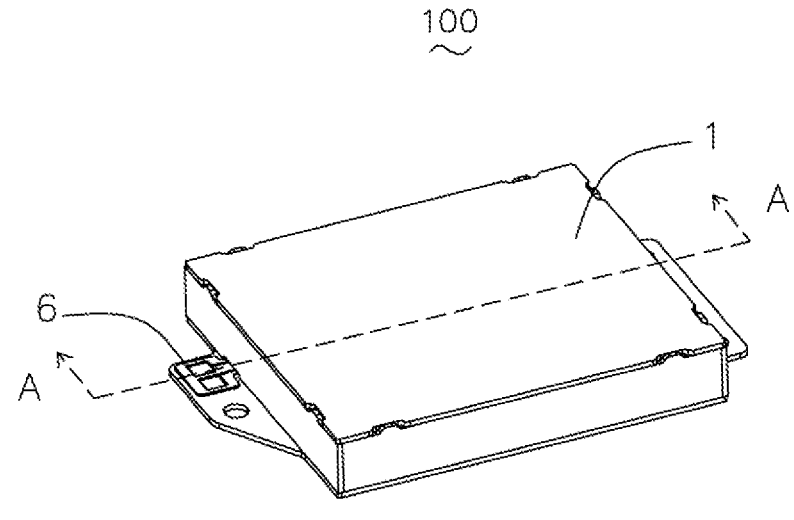
FIG. 1 is a schematic diagram of a three-dimensional structure of a linear vibration motor according to a first embodiment of the present disclosure.
Figure 2:
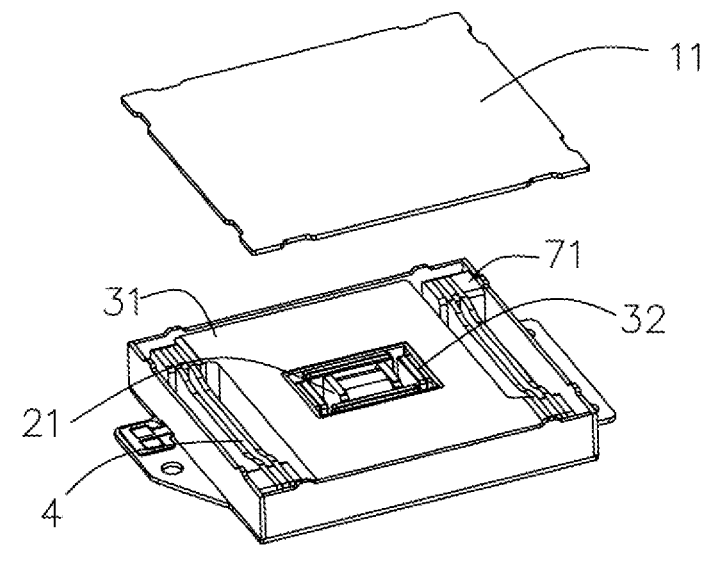
FIG. 2 is a partial exploded view of the linear vibration motor shown in FIG. 1.
Figure 3:
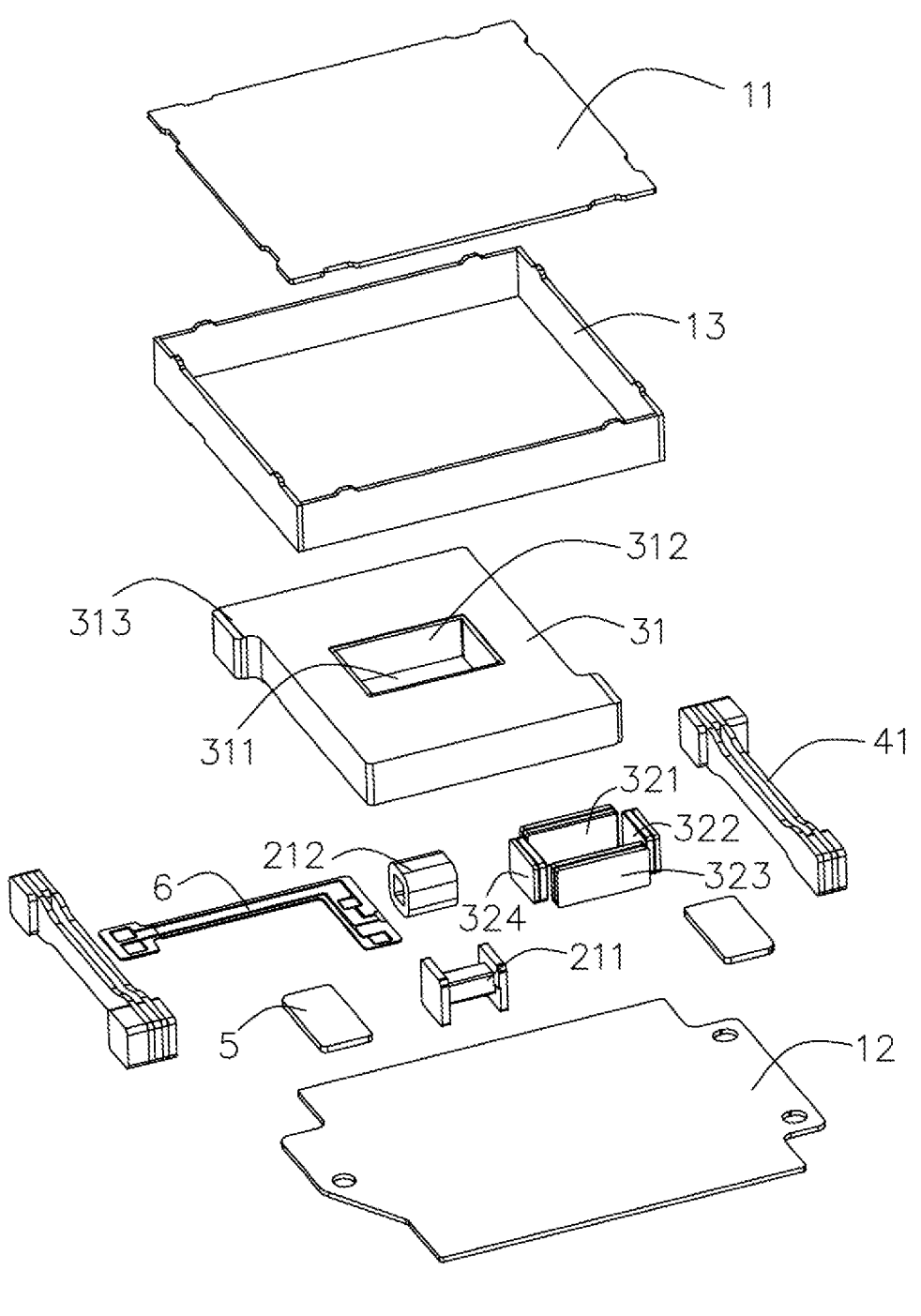
FIG. 3 is an exploded view of the linear vibration motor shown in FIG. 1.
Figure 4:
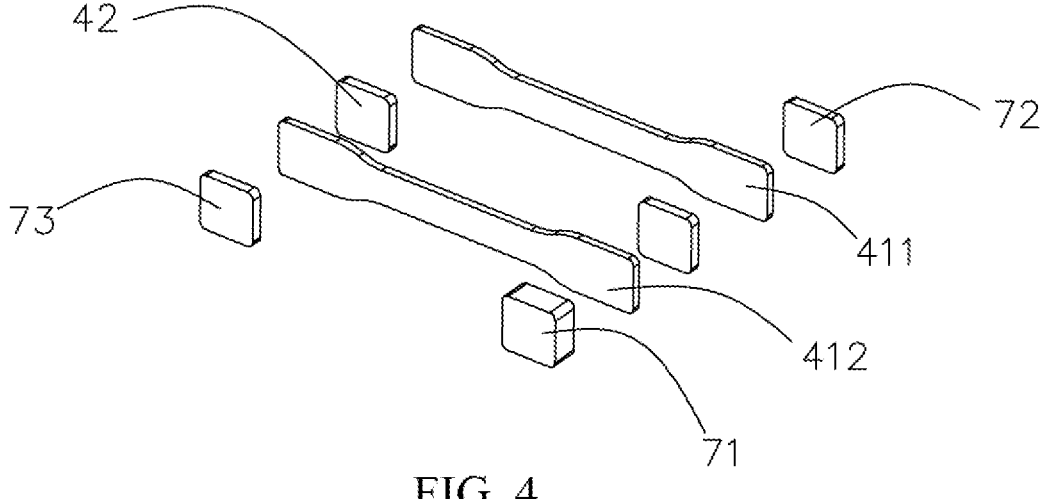
FIG. 4 is an exploded view of some components of the linear vibration motor shown in FIG. 1.
Figure 5:
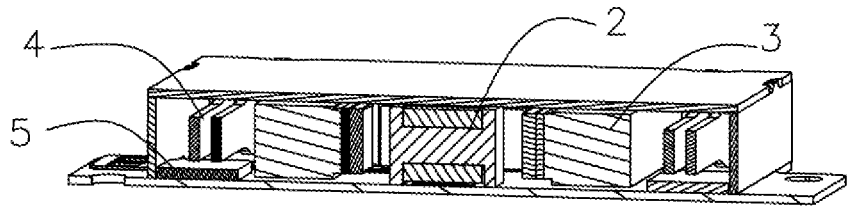
FIG. 5 is a sectional view taken along A-A in FIG. 1.

The technical solutions in the embodiments of the present disclosure will be described below with reference to the accompanying drawings in the embodiments of the present disclosure. It should be noted that, the described embodiments are merely a part of instead of all of the embodiments of the present disclosure. Based on the embodiments in the present disclosure, all other embodiments obtained by those of ordinary skill in the art without creative efforts shall fall within a scope of the present disclosure.

Referring to FIG. 1 to FIG. 5 together, a first embodiment of the present disclosure provides a linear vibration motor 100, including a housing 1, a stator 2 mounted in the housing 1, a vibrator 3, an elastic connector 4 suspending the vibrator 3 in the housing 1, and a stopping sheet 5 and a circuit board 6 that are fixed to two sides of the housing 1.

The housing 1 includes an upper cover 11, a lower cover 12 arranged opposite to the upper cover 11, and an enclosure wall 13 connecting the upper cover 11 and the lower cover. The upper cover 11, the lower cover 12, and the enclosure wall 13 enclose to form a space for receiving the stator 2 and the vibrator 3. The stator 2 is fixedly mounted to the lower cover 12, and the circuit board 6 partially extends out of the housing 1.

The stator 2 includes a solenoid 21 fixed to the lower cover 12. An axis of the solenoid 21 is parallel to a vibrating direction of the vibrator 3. The solenoid 21 includes an iron core 211 and a coil 212 wound around the iron core 211. The coil 212 is electrically connected to the circuit board 6, and an alternating current is applied to the coil 212.

The vibrator 3 is suspended in the housing 1 through the elastic connector 4, and the vibrator vibrates left and right in a horizontal direction so that the linear vibration motor 100 provides a sense of vibration. The vibrator 3 includes a weight 31 provided with a through hole 311, and a magnet assembly 32 fixed to an inner wall 312 of the weight 31 enclosing to form the through hole 311. The magnet assembly 32 is arranged around the solenoid 21. The magnet assembly 32 includes first magnets 321 arranged at two sides of the solenoid 21 along the vibrating direction of the vibrator 3, second magnets 322 arranged at two ends of the solenoid 21 along a direction perpendicular to the vibrating direction of the vibrator 3, a first pole plate 323 arranged between the first inner wall 312 of the weight 31 and the first magnet 321, and a second pole plate 324 arranged between the second inner wall 312 of the weight 31 and the second magnet 322. Two first magnets 321 are provided. The two sides of the solenoid 21 are each provided with one of the first magnets 321. The first magnet 321 is magnetized along the direction perpendicular to the vibrating direction of the vibrator 3, and the two first magnets 321 have poles of a same polarity opposite to each other. The first magnet 321 may be magnetized in a single segment, or magnetized in multiple segments. Taking three segments as an example, magnetization directions of adjacent segments are opposite. Two second magnets 322 are provided. The two ends of the solenoid 21 are each provided with one of the second magnets 322. The second magnet 322 is magnetized along the direction perpendicular to the vibrating direction of the vibrator 3, and the two second magnets 322 have poles of a same polarity opposite to each other. In this embodiment, the first magnet 321 and the second magnet 322 are bonded and fixed to the first pole plate 323 and the second pole plate 324 by glue.

The weight 31 is provided with a protruding portion 313 extending along the vibrating direction of the vibrator 3, and the protruding portion 313 protrudes and extends from a diagonal position of the weight 31.

An alternating current is applied to the coil 212 to cut a magnetic induction line of the magnet assembly 32 to generate an induced electromotive force, so that the magnet assembly 32 and the weight 31 fixed thereto vibrate left and right reciprocally, providing a sense of motor vibration. The elastic connector 4 elastically supports the vibrator 3. The linear vibration motor 100 further includes a first soldering lug 71. The elastic connector 4 has an end connected to the weight 31 and another end connected to the housing 1 through the first soldering lug 71, to provide an elastic recovery force for the vibrator 3. The elastic connector 4 includes at least two plate-shaped elastic sheets 41 arranged in parallel and a spacer 42 arranged at two ends of adjacent elastic sheets 41 to separate the two adjacent elastic sheets 41. In this embodiment, a number of the elastic sheet 41 is two, the spacer 42 is a soldering lug, and the spacer 42 is welded and fixed between two adjacent elastic sheets 41.

In an example, the elastic sheet 41 includes a first elastic sheet 411 fixedly connected to the weight 31 and a second elastic sheet 412 fixedly connected to the housing 1, and the elastic connector 4 further includes a second soldering lug 72 arranged at an end of the first elastic sheet 411 not fixed to the weight 31 and a third soldering lug 73 arranged at an end of the second elastic sheet 412 not fixed to the housing 1. A thickness of the first soldering lug 71 is greater than that of the second soldering lug 72, and the thickness of the first soldering lug 71 is greater than that of the third soldering lug 73. The first elastic sheet 411 is fixed to the protruding portion 313, and the thickness of the first soldering lug 71 can be adjusted according to a thickness of the protruding portion 313 on the weight 31, to provide a sufficient vibration space for the vibrator 3.

The stopping sheet 5 is fixed to the lower cover 12 and located on a vibration path of the vibrator 3 to limit displacement of the vibrator 3.

Figure 6:
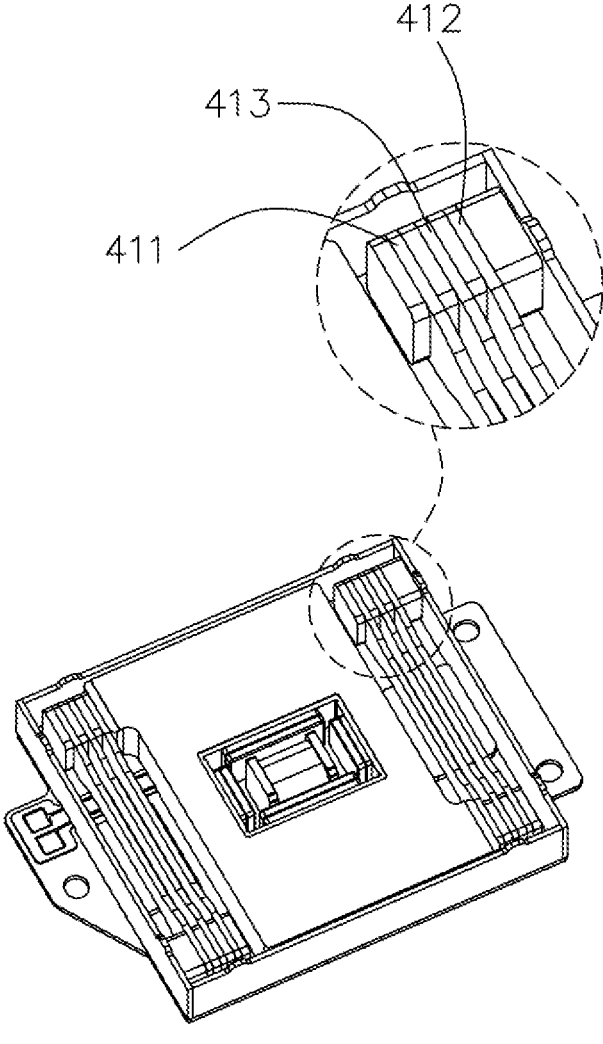
FIG. 6 is a schematic diagram of a three-dimensional structure of some components of a linear vibration motor according to a second embodiment of the present disclosure.

In a second embodiment of the present disclosure, as shown in FIG. 6, other structures are all the same as those in the first embodiment, and differences are as follows. The elastic connector 4 further includes a third elastic sheet 413 arranged between the first elastic sheet 411 and the second elastic sheet 412. In an example, a distance between the third elastic sheet 413 and the first elastic sheet 411 is equal to a distance between the third elastic sheet 413 and the second elastic sheet 412.

The number of the elastic sheet is not limited in the present disclosure, and a corresponding number may be set according to an actual requirement.

Compared with the related art, the linear vibration motor according to the present disclosure includes a housing, a stator mounted in the housing, a vibrator, and an elastic connector suspending the vibrator in the housing. The stator includes a solenoid fixed to the housing. The vibrator includes a weight provided with a through hole, and a magnet assembly fixed to an inner wall of the weight enclosing to form the through hole. The elastic connector includes at least two plate-shaped elastic sheets arranged in parallel and a spacer arranged at two ends of adjacent elastic sheets to separate the two adjacent elastic sheets. The linear vibration motor further includes a first soldering lug. The elastic connector has an end connected to the weight, and another end connected to the housing through the first soldering lug. In the elastic connector of the linear vibration motor of the present disclosure, the plate-shaped elastic sheets are connected to each other in parallel, so that the rigidity of the elastic connector increases, the difference between the first-order and second-order modes can reach about 3 times, and the difference between the second-order and third-order modes can reach about twice, making it difficult for the vibrator to excite a high-order mode during motion. The vibrator is not prone to flipping during the motion, which can effectively reduce a noise ratio, and the vibration state is more stable. When a resonant frequency of the linear vibration motor is required to be high, a design purpose can be achieved by increasing a thickness of the plate-shaped elastic sheet or increasing a number of the elastic sheets connected in parallel, thereby bringing more options compared with the existing solutions. When the resonant frequency of the linear vibration motor is required to be high and the thickness of the plate-shaped elastic sheet is increased, since stress of the plate-shaped elastic sheet is not sensitive to a thickness of a material, reliability of the product may not be damaged due to an increase in the stress of the elastic connector caused by an increase in the thickness of the material. When the linear vibration motor has a high requirement on the stress of the elastic connector, improvement can be achieved by increasing the number of the elastic sheets connected in parallel and reducing the thickness of the material. This method has a significant effect. The flat-shaped elastic sheet is a simple blanking member, which has a simple shape and simple manufacturing and assembly processes, facilitating control over product costs.

The above descriptions are only some embodiments of the present disclosure. It should be pointed out herein that, for those of ordinary skill in the art, improvements can also be made without departing from the creative concept of the present disclosure, all of which shall fall within a scope of the present disclosure.

What is claimed is:

1. A linear vibration motor, comprising a housing, a stator mounted in the housing, a vibrator, and an elastic connector suspending the vibrator in the housing, wherein the stator comprises a solenoid fixed to the housing, the vibrator comprises a weight provided with a through hole and a magnet assembly fixed to an inner wall of the weight enclosing to form the through hole, the elastic connector comprises at least two plate-shaped elastic sheets arranged in parallel and a spacer arranged at two ends of two adjacent plate-shaped elastic sheets to separate the two plate-shaped adjacent elastic sheets, the linear vibration motor further comprises a first soldering lug, and the elastic connector has an end connected to the weight and another end connected to the housing through the first soldering lug;

the elastic sheets comprise a first elastic sheet fixedly connected to the weight and a second elastic sheet fixedly connected to the housing, and the elastic connector further comprises a second soldering lug arranged at an end of the first elastic sheet not fixed to the weight and a third soldering lug arranged at an end of the second elastic sheet not fixed to the housing.

2. The linear vibration motor as described in claim 1, wherein the spacer is a soldering lug, and the spacer is welded and fixed between two adjacent elastic sheets.

3. The linear vibration motor as described in claim 1, wherein a thickness of the first soldering lug is greater than a thickness of the second soldering lug, and the thickness of the first soldering lug is greater than a thickness of the third soldering lug.

4. The linear vibration motor as described in claim 1, wherein the weight is provided with a protruding portion extending along a vibrating direction of the vibrator, and the first elastic sheet is fixed to the protruding portion.

5. The linear vibration motor as described in claim 1, wherein the elastic connector further comprises a third elastic sheet arranged between the first elastic sheet and the second elastic sheet.

6. The linear vibration motor as described in claim 5, wherein a distance between the third elastic sheet and the first elastic sheet is equal to a distance between the third elastic sheet and the second elastic sheet.

7. The linear vibration motor as described in claim 1, wherein the magnet assembly comprises first magnets arranged at two sides of the solenoid along a vibrating direction of the vibrator and second magnets arranged at two ends of the solenoid along a direction perpendicular to the vibrating direction of the vibrator.

8. The linear vibration motor as described in claim 7, wherein the magnet assembly further comprises a first pole plate arranged between the inner wall of the weight and each of the first magnets and a second pole plate arranged between the inner wall of the weight and each of the second magnets.

* * * * *